Jan. 9, 1951   D. H. BOISBLANC   2,537,439
BOTTLE WARMING AND STERILIZING DEVICE
Filed May 6, 1947
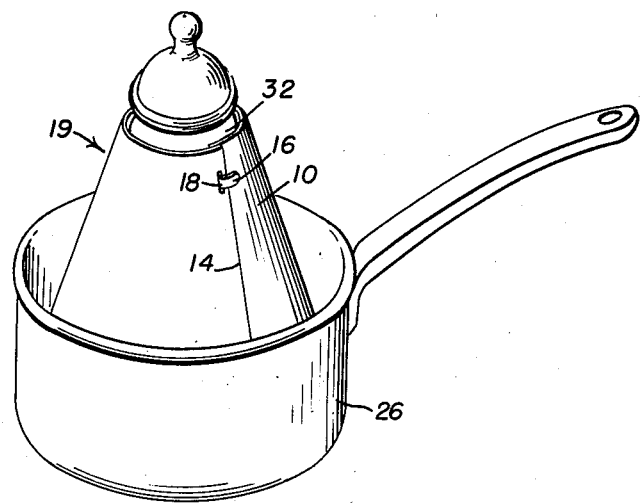
Fig. 1.
Fig. 3.
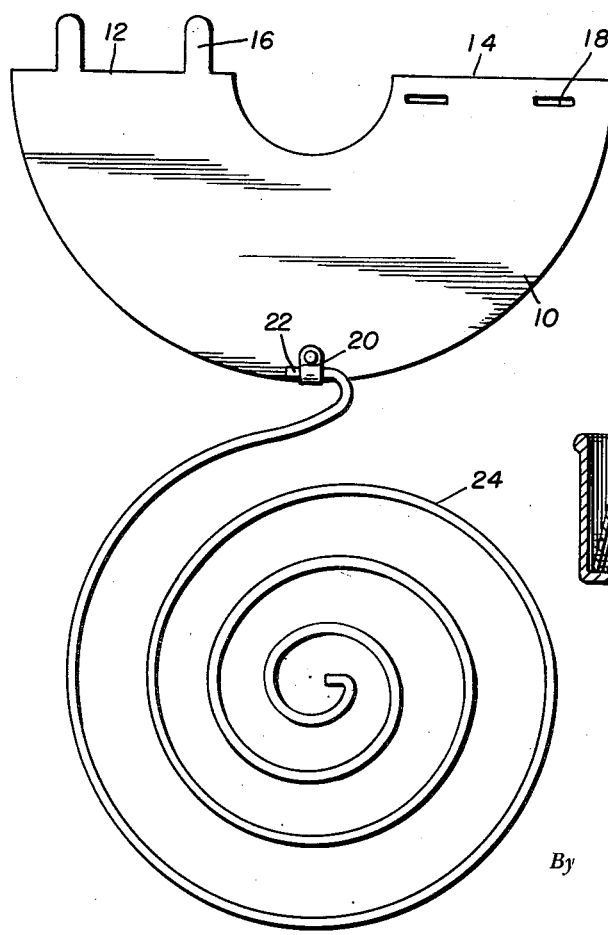
Fig. 2.
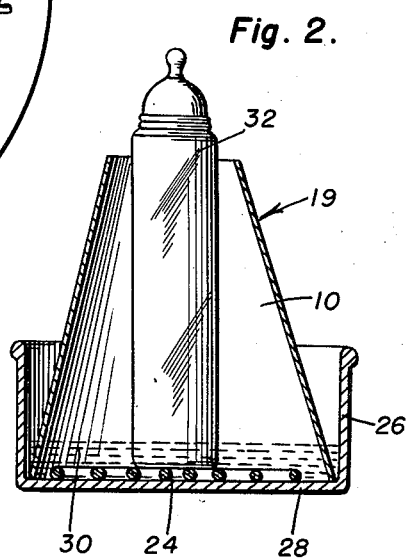
*Inventor*
Darius H. Boisblanc
By *Clarence A. O'Brien and Harvey B. Jacobson*
*Attorneys*

Patented Jan. 9, 1951

2,537,439

UNITED STATES PATENT OFFICE 2,537,439

BOTTLE WARMING AND STERILIZING DEVICE

Darius H. Boisblanc, Lafayette, La.

Application May 6, 1947, Serial No. 746,185

2 Claims. (Cl. 126—261)

This invention relates to new and useful improvements in bottle warming and sterilizing devices and the primary object of the present invention is to provide a receptacle particularly useful in heating and sterilizing baby bottles.

Another important object of the present invention is to provide a bottle receiving member that is so designed as to direct the steam from the boiling water in which the bottle is inserted to fully contact the entire surface area of the bottle for quickly warming the contents therein.

A further object of the present invention is to provide a receptacle that is quickly and readily disassembled for cleaning or for transporting thereof.

A still further aim of the present invention is to provide a bottle warming and sterilizing device that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a cooking pan, the present invention in use therewith and shown embracing a baby bottle;

Figure 2 is a transverse vertical sectional view of Figure 1; and,

Figure 3 is an enlarged plan view of the present invention in an unfolded position.

Referring now to the drawings in detail, wherein for the purpose of illustration, there is disclosed a preferred embodiment of the present invention, the numeral 10 represents a flat substantially semi-circular ring of preferably aluminum material and provided with radial edges 12 and 14. A pair of longitudinally spaced ears 16 project outwardly from one of these edges, as for example 12, and engages a pair of longitudinally spaced apertures 18 provided in the other edge 14 and are bent inwardly, to lockably retain the ring in a substantially frusto-conical form of receptacle 19.

Pivoted or otherwise secured to the inner face of the ring, is a fastening member 20 that engages the out-turned terminal portion 22 of a spirally wound co-planar member 24.

In practical use of the device, the receptacle 19 is inserted into a pan or the like 26 with the lower edge of the receptacle 19 bearing on the bottom 28 of this pan and the member 24 also bearing on the bottom. A liquid 30 is then poured into the receptacle to submerge the member 24. A baby bottle or the like 32 is inserted into the receptacle and bears on the member 24. The pan is then placed over a source of heat which causes the liquid 30 in the receptacle to reach a boiling stage with the steam from the liquid contacting the entire surface area of the bottle 32, to rapidly warm the contents therein.

By inverting the bottle so that the mouth of the bottle bears on the member 24 and by placing only a small quantity of liquid in the receptacle so that the member 24 is not submerged, the bottle may be conveniently sterilized by the steam from the boiling liquid 30.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A baby bottle warming and sterilizing device comprising a flat semi-circular plate having a longitudinal edge, an arcuate notch provided in the central portion of the longitudinal edge to divide the longitudinal edge into a pair of equal length radial edges, means for retaining the radial edges of said plate to each other to form a frusto-conical body adapted to loosely embrace a bottle, and a co-planar spirally wound member carried by the plate, said spirally wound member adapted to be partially submerged in a fluid medium so that as the fluid medium is heated, steam rising therefrom will contact a bottle supported on the member and embraced by the body.

2. A bottle warming and sterilizing device comprising, a flat semi-circular plate having a diametrical edge, an arcuate notch provided in the central portion of the diametrical edge to divide the same into a pair of equal length radial edges, tongue and slot connecting means between the radial edges to retain the plate in the form of an elongated frusto-conical body adapted to loosely embrace a bottle, a flat and coplanar spirally wound member confined within the body and disposed perpendicular to the body, and means removably securing one end of said member to said plate, said member adapted to bear against the bottom wall of a pan, said member adapted to be partially submerged in a fluid medium so that as the fluid medium is heated, steam will rise therefrom to contact a bottle supported on the member and embraced by the body.

DARIUS H. BOISBLANC.

REFERENCES CITED

The following references are of record in the file of this patent:

UNITED STATES PATENTS

| Number | Name | Date |
|---|---|---|
| 501,574 | Nye | July 18, 1893 |
| 538,056 | Wilder | Apr. 23, 1895 |
| 664,117 | Bates | Dec. 18, 1900 |
| 787,688 | Parker | Apr. 18, 1905 |
| 1,276,905 | Hall | Aug. 27, 1918 |
| 1,354,409 | Lawson, et al. | Sept. 28, 1920 |
| 1,455,027 | Ludwig | May 15, 1923 |
| 1,485,159 | Bartholomew | Feb. 26, 1924 |
| 1,618,622 | Woolsey | Feb. 22, 1927 |

FOREIGN PATENTS

| Number | Country | Date |
|---|---|---|
| 616,531 | France | Oct. 29, 1926 |